United States Patent
Grois et al.

(10) Patent No.: US 10,958,908 B2
(45) Date of Patent: Mar. 23, 2021

(54) PROCESSING MEDIA USING NEURAL NETWORKS

(71) Applicant: Comcast Cable Communications, LLC, Philadelphia, PA (US)

(72) Inventors: Dan Grois, Beer-Sheva (IL); Alexander Giladi, Princeton, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 16/736,649

(22) Filed: Jan. 7, 2020

(65) Prior Publication Data

US 2020/0221093 A1 Jul. 9, 2020

Related U.S. Application Data

(60) Provisional application No. 62/789,837, filed on Jan. 8, 2019.

(51) Int. Cl.
*H04N 19/127* (2014.01)
*H04N 19/103* (2014.01)
(Continued)

(52) U.S. Cl.
CPC ......... *H04N 19/127* (2014.11); *H04N 19/103* (2014.11); *H04N 19/137* (2014.11); *H04N 19/159* (2014.11); *H04N 19/172* (2014.11)

(58) Field of Classification Search
CPC .. H04N 19/127; H04N 19/159; H04N 19/103; H04N 19/172; H04N 19/137
See application file for complete search history.

(56) References Cited

U.S. PATENT DOCUMENTS

| 8,243,813 B2 * | 8/2012 | Hatabu | H04N 19/85 |
| | | | 375/240.2 |
| 10,528,819 B1 * | 1/2020 | Manmatha | G06K 9/6273 |

(Continued)

FOREIGN PATENT DOCUMENTS

| EP | 1227684 A2 * | 7/2002 | ............. H04N 19/17 |
| GB | 2558644 A  * | 7/2018 | ........... H04N 19/103 |

OTHER PUBLICATIONS

Chen Yue et al: "An Overview of Core Coding Tools in the AV1 Video Codec", 2018 Picture Coding Symposium (PCS), IEEE, Jun. 24, 2018 (Jun. 24, 2018), pp. 41-45, XP033398574.

(Continued)

*Primary Examiner* — Richard A Hansell, Jr.
(74) *Attorney, Agent, or Firm* — BakerHostetler (57) ABSTRACT

An encoder may determine a plurality of coding units associated with a frame of a media file and a plurality of prediction units associated with the frame of the media file. The encoder may determine, based on the plurality of coding units associated with the frame and the plurality of prediction units associated with the frame, and based on a training of the encoder using one or more neural networks, that a particular region of the frame can be encoded using one or more encoding characteristics that are different than the encoding characteristics of one or more other particular regions of the frame. The encoder may allocate one or more encoding resources to the particular region of the frame based on the one or more encoding characteristics of the particular region of the frame in order to reduce the overall media bitrate.

20 Claims, 5 Drawing Sheets

(51) Int. Cl.
*H04N 19/137* (2014.01)
*H04N 19/159* (2014.01)
*H04N 19/172* (2014.01)

(56) References Cited

U.S. PATENT DOCUMENTS

| | | | |
|---|---|---|---|
| 2014/0241433 A1* | 8/2014 | Bosse | H04N 19/553 375/240.16 |
| 2019/0230367 A1* | 7/2019 | Zhu | H04N 21/23434 |
| 2019/0333263 A1* | 10/2019 | Melkote Krishnaprasad | G06F 3/012 |
| 2020/0092556 A1* | 3/2020 | Coelho | H04N 19/147 |
| 2020/0134837 A1* | 4/2020 | Varadarajan | G06T 7/246 |
| 2020/0143457 A1* | 5/2020 | Manmatha | G06F 16/7867 |

OTHER PUBLICATIONS

Chichen Fu et al: "Texture Segmentation Based Video Compression Using Convolutional Neural Networks", arxiv.org, Cornell University Library, 201 Olin Library Cornell University Ithaca, NY 14853, Feb. 8, 2018 (Feb. 8, 2018), XP081220098.

Chun-Man Mak et al: "Enhancing compression rate by just-noticeable distortion model for H.264/AVC", Circuits and Systems, 2009. ISCAS 2009. IEEE International Symposium on, IEEE, Piscataway, NJ, USA, May 24, 2009 (May 24, 2009), pp. 609-612, XP031479264.

Di Chen et al: "AV1 Video Coding Using Texture Analysis With Convolutional Neural Networks", arxiv.org, Cornell University Library, 201 Olin Library Cornell University Ithaca, NY 14853, Apr. 25, 2018 (Apr. 25, 2018), XP081229677.

Marc Bosch et al: "Segmentation-Based Video Compression Using Texture and Motion Models", IEEE Journal of Selected Topics in Signal Processing, IEEE, US, vol. 5, No. 7, Nov. 1, 2011 (Nov. 1, 2011), pp. 1366-1377, XP011363093.

* cited by examiner

PROCESSING MEDIA USING NEURAL NETWORKS

CROSS-REFERENCE TO RELATED APPLICATIONS

This application claims the benefit of U.S. Provisional Application No. 62/789,837, filed on Jan. 8, 2019, which is hereby incorporated by reference in its entirety.

BACKGROUND

The first version of the High Efficiency Video Coding (HEVC) standard was officially approved in 2013. HEVC enables more efficient compression of high-resolution video content, such as 3840×2160 resolutions (e.g., 4K resolution) in terms of luma samples, compared to the preceding standards such as H.264/MPEG-AVC. HEVC provides a good trade-off between the content visual quality and its corresponding bit-rate.

The next generation video coding standard, Versatile Video Coding (VVC) standard has officially started. The VVC standard is being developed in consideration with the ultra high-definition (UHD) resolution as well as the high frame rate video requirements. However, the average computational complexity of VVC is expected to be several times higher than of its predecessor, HEVC. Therefore, there is a need to improve perceived visual quality with relatively low complexity processing and to further keep the output bit-rate as low as possible. These and other shortcomings are addressed in the present disclosure.

SUMMARY

Methods and systems are disclosed herein for reducing media bit-rate without substantially decreasing media content quality. An encoder may determine a plurality of coding units associated with a frame of a media file and a plurality of prediction units associated with the frame of the media file. The encoder may determine, based on the plurality of coding units associated with the frame and the plurality of prediction units associated with the frame, and based on a training of the encoder using one or more neural networks, that a particular region of the frame can be encoded using one or more encoding characteristics that are different than the encoding characteristics of one or more other particular regions of the frame. In one example, the encoder may determine that one or more motion vectors associated with the particular region (e.g., a background) of the frame are not important to a viewer of the frame. The encoder may allocate one or more encoding resources to the particular region of the frame based on the one or more encoding characteristics of the particular region of the frame, such as allocating less bits to the particular region of the frame that is determined to be less important to a viewer of the frame, thereby reducing the overall media bitrate.

BRIEF DESCRIPTION OF THE DRAWINGS

The following detailed description is better understood when read in conjunction with the appended drawings. For the purposes of illustration, examples are shown in the drawings; however, the subject matter is not limited to specific elements and instrumentalities disclosed. In the drawings.

DETAILED DESCRIPTION

Methods and systems are disclosed for reducing bit-rate in a media file without decreasing media content quality. High Efficiency Video Coding (HEVC) allows a video frame to be partitioned into a plurality of square-shaped coding tree blocks (CTBs), which are the basic processing units of HEVC. CTBs come in variable sizes (e.g., 16×16, 32×32 or 64×64) and, along with associated syntax elements (e.g., one luma CTB and two corresponding chroma CTBs), form a coding tree unit (CTU). Generally, larger CTU sizes result in better coding efficiency in high resolutions. However, this may come at the price of a noticeable increase in computational complexity.

Video encoding as described herein may comprise partitioning a frame into a plurality of CTUs that each comprise a plurality of pixels. The CTUs may be partitioned into coding units (CUs) (e.g., coding blocks). The encoder may generate a prediction for each current CU based on previously encoded data. The prediction may comprise intra-picture prediction, which is based on previously encoded data of the current frame being encoded. Intra-picture prediction may be referred to herein simply as intra-prediction. The prediction may additionally or alternatively comprise inter-picture prediction, which is based on previously encoded data of a previously encoded reference frame. The inter-picture prediction stage may comprise determining a prediction unit (PU) (e.g., a prediction area) using motion compensation by determining a PU that best matches a prediction region in the CU. Inter-picture prediction may also be referred to herein simply as inter-prediction. The encoder may generate a residual signal by determining a difference between the determined PU from the prediction region in the CU. The residual signals may then be transformed using, for example, a discrete cosine transform (DCT), which may generate coefficients associated with the residuals.

The encoder may perform a quantization process to quantize the coefficients. The transformation and quantization processes may be performed on transform units (TUs) based on partitions of the CUs. The compressed bitstream may then be transmitted by the encoder. The transmitted compressed bitstream may comprise the quantized coefficients and information to enable the decoder to regenerate the prediction blocks, such as motion vectors associated with the motion compensation. The decoder may receive the compressed bitstream and may decode the compressed bitstream to regenerate the video content.

For both the intra-picture (spatial) and inter-picture (temporal motion-compensated) prediction, each CU can be further subdivided into smaller blocks along the coding tree boundaries. As a result, at least one PU is defined for each CU in order to provide the prediction data, while the selected prediction mode indicates whether the CU (consisting of a single luma coding unit and two chroma CUs) is coded using the intra-picture or inter-picture prediction.

As discussed herein, it may be determined that one or more frames of the media file may comprise at least one region that is less important or less noticeable to a user. The determination may be based on the inter-picture prediction methods. An example region may contain one or more textures, including but not limited to grass, water, wood, sidewalk, textile material (including clothes, etc.), rubber, stone, sponge, plastic, paper, paint, tree leaves, etc. In such cases, the inter-prediction residual is not important and the difference between the inter-predicted frames is not noticeable at all by the viewer (e.g., below a Just Noticeable Difference (JND) of the Human Visual System (HVS)).

A dedicated neural network may be trained for determining areas within each frame with such regions. The neural network may comprise one or more of a deep network, a convolutional network, or a recurring neural network (RNN). However, it is understood that the neural network may be any type of neural network and is not limited to these examples. The training may be performed based on a database of images, including the above-mentioned texture images. Such regions may be automatically determined during the encoding loop within each frame, which is further segmented accordingly. In case of inter-prediction, upon performing the above-mentioned segmentation of such regions, the inter-prediction residual may be zeroed and not transmitted at all, which in turn leads to a significant decrease in a bit-rate. The zeroed residual can be a residual between consecutive or non-consecutive frames, depending on the content type. Since such regions are less noticeable or less important to the viewer, this step is substantially not perceived by the viewer, and therefore the perceptual video content quality change is negligible (if any).

The disclosed methods and systems can be transparently used by all existing codecs, thereby not requiring any change/update at the decoder end (e.g., only the encoder end is revised by incorporating the above-mentioned dedicated neural network).

While the methods and systems are discussed above in connection with H.265/MPEG-HEVC, it is understood that the methods and systems may be applied to any block-based hybrid video coding standards, such as H.264/MPEG-AVC, VVC, etc. The methods and systems may additionally or alternatively be used for High Dynamic Range (HDR) and Standard Dynamic Range (SDR) video content, noting that the demand to preserve fine details and colors is higher in HDR.

Figure 1:
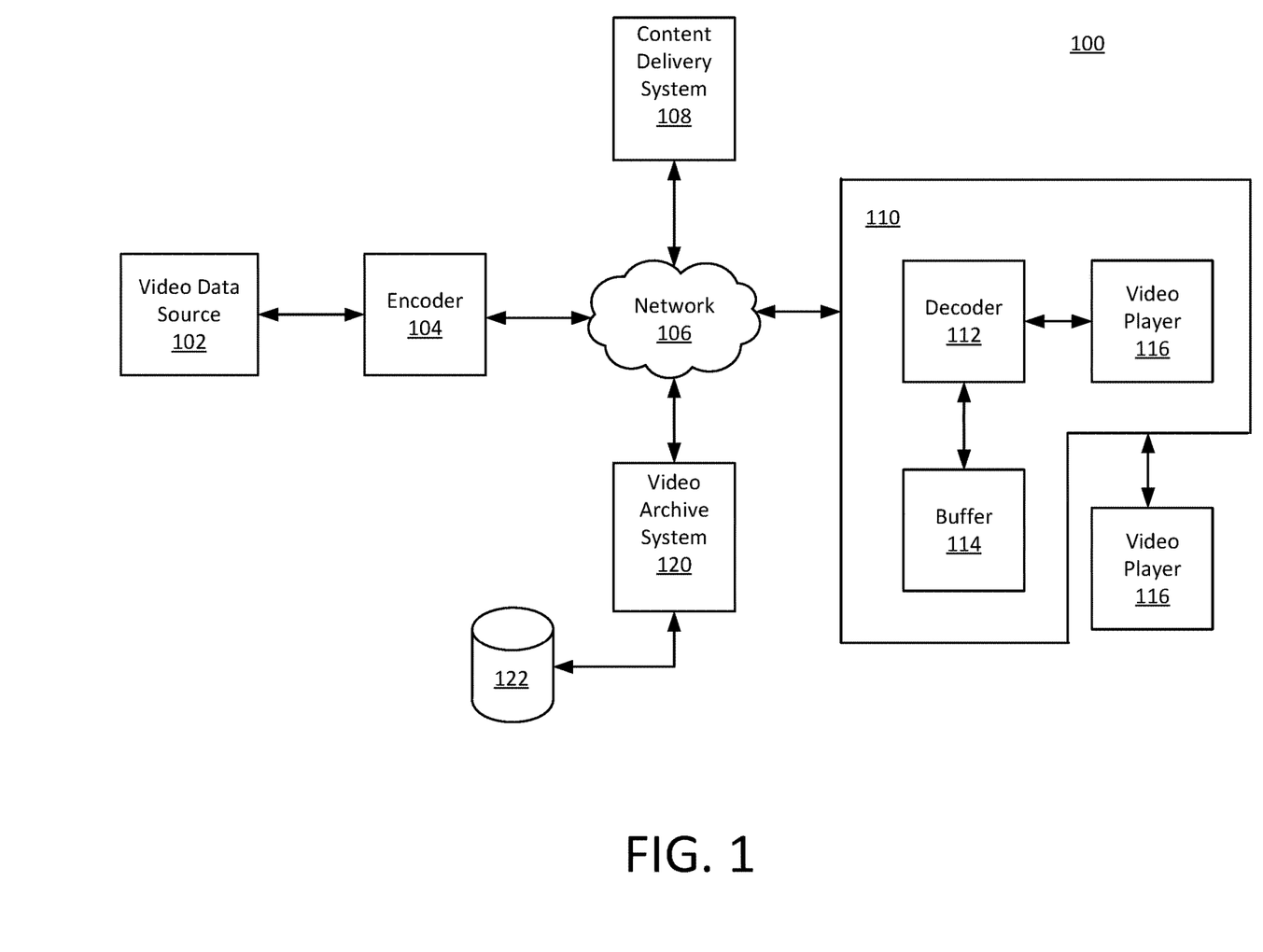
FIG. 1 is a block diagram of an example system.

FIG. 1 shows system 100 configured for video processing. The system 100 may comprise a video data source 102, an encoder 104, a content delivery system 108, a computing device 110, and a video archive system 120. The video archive system 120 may be communicatively connected to a database 122 to store archived video data.

The video data source 102, the encoder 104, the content delivery system 108, the computing device 110, the video archive system 120, and/or any other component of the system 100 may be interconnected via a network 106. The network 106 may comprise a wired network, a wireless network, or any combination thereof. The network 106 may comprise a public network, such as the Internet. The network 106 may comprise a private network, such as a content provider's distribution system. The network 106 may communicate using technologies such as WLAN technology based on the Institute of Electrical and Electronics Engineers (IEEE) 802.11 standard, wireless cellular technology, Bluetooth, coaxial cable, Ethernet, fiber optics, microwave, satellite, Public Switched Telephone Network (PTSN), Digital Subscriber Line (DSL), BPL, or any other appropriate technologies.

The video data source 102 may comprise a headend, a video on-demand server, a cable modem termination system, the like, and/or any combination of the foregoing. The video data source 102 may provide uncompressed, raw video data comprising a sequence of frames. The video data source 102 and the encoder 104 may be incorporated as a single device and/or may be co-located at a premises. The video data source 102 may provide the uncompressed video data based on a request for the uncompressed video data, such as a request from the encoder 104, the computing device 110, the content delivery system 108, and/or the video archive system 120.

The content delivery system 108 may receive a request for video data from the computing device 110. The content delivery system 108 may authorize/authenticate the request and/or the computing device 110 from which the request originated. The request for video data may comprise a request for a channel, a video on-demand asset, a website address, a video asset associated with a streaming service, the like, and/or any combination of the foregoing. The video data source 102 may transmit the requested video data to the encoder 104.

The encoder 104 may encode (e.g., compress) the video data. The encoder 104 may transmit the encoded video data to the requesting component, such as the content delivery system 108 or the computing device 110. The content delivery system 108 may transmit the requested encoded video data to the requesting computing device 110. The video archive system 120 may provide a request for encoded video data. The video archive system 120 may provide the request to the encoder 104 and/or the video data source 102. Based on the request, the encoder 104 may receive the corresponding uncompressed video data. The encoder 104 may encode the uncompressed video data to generate the requested encoded video data. The encoded video data may be provided to the video archive system 120. The video archive system 120 may store (e.g., archive) the encoded video data from the encoder 104. The encoded video data may be stored in the database 122. The stored encoded video data may be maintained for purposes of backup or archive. The stored encoded video data may be stored for later use as "source" video data, to be encoded again and provided for viewer consumption. The stored encoded video data may be provided to the content delivery system 108 based on a request from a computing device 110 for the encoded video data. The video archive system 120 may provide the requested encoded video data to the computing device 110.

The computing device 110 may comprise a decoder 112, a buffer 114, and a video player 116. The computing device 110 (e.g., the video player 116) may be communicatively connected to a display 118. The display 118 may be a separate and discrete component from the computing device 110, such as a television display connected to a set-top box. The display 118 may be integrated with the computing device 110. The decoder 112, the video player 116, the buffer 114, and the display 118 may be realized in a single device, such as a laptop or mobile device. The computing device 110 (and/or the computing device 110 paired with the display 118) may comprise a television, a monitor, a laptop, a desktop, a smart phone, a set-top box, a cable modem, a gateway, a tablet, a wearable computing device, a mobile computing device, any computing device configured to receive and/or playback video, the like, and/or any combination of the foregoing. The decoder 112 may decompress/decode the encoded video data. The encoded video data may be received from the encoder 104. The encoded video data may be received from the content delivery system 108, and/or the video archive system 120.

Figure 2:
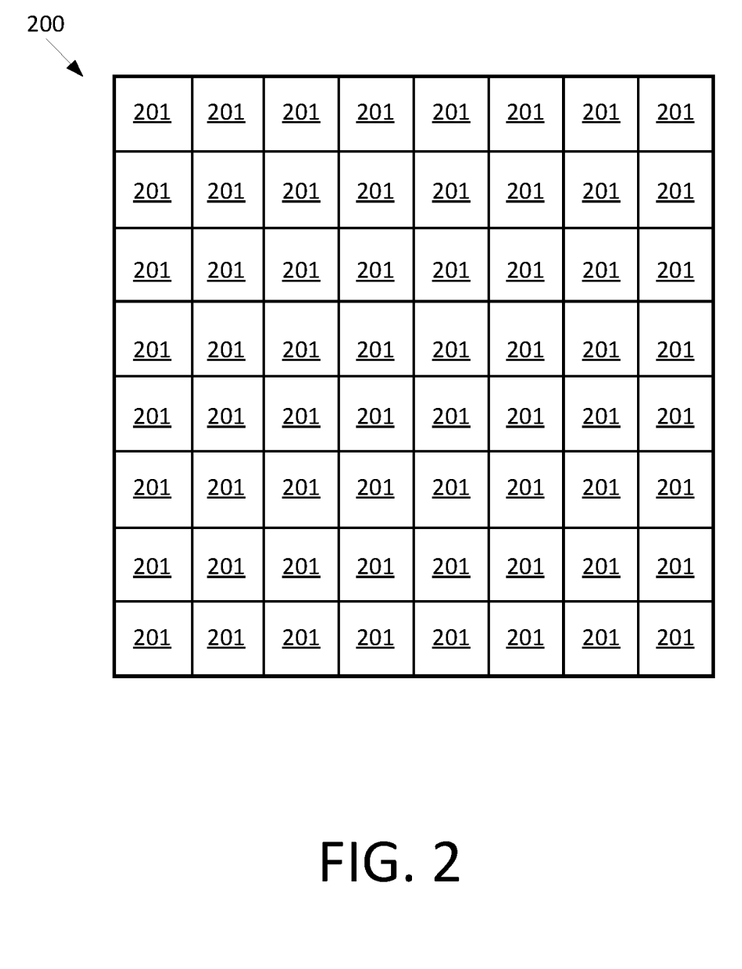
FIG. 2 shows an example division of a coding tree unit (CTU)

FIG. 2 shows an example division to a coding tree unit (CTU) 200. In the example of FIG. 2, a frame is divided into a plurality of CTUs 201. As described above, a luma block in CTU 201 in VVC may comprise 128×128 pixels. The maximum luma transform block (TB) size may comprise 64×64 pixels, and the maximum chroma TB size may comprise 32×32 pixels.

Figure 3:
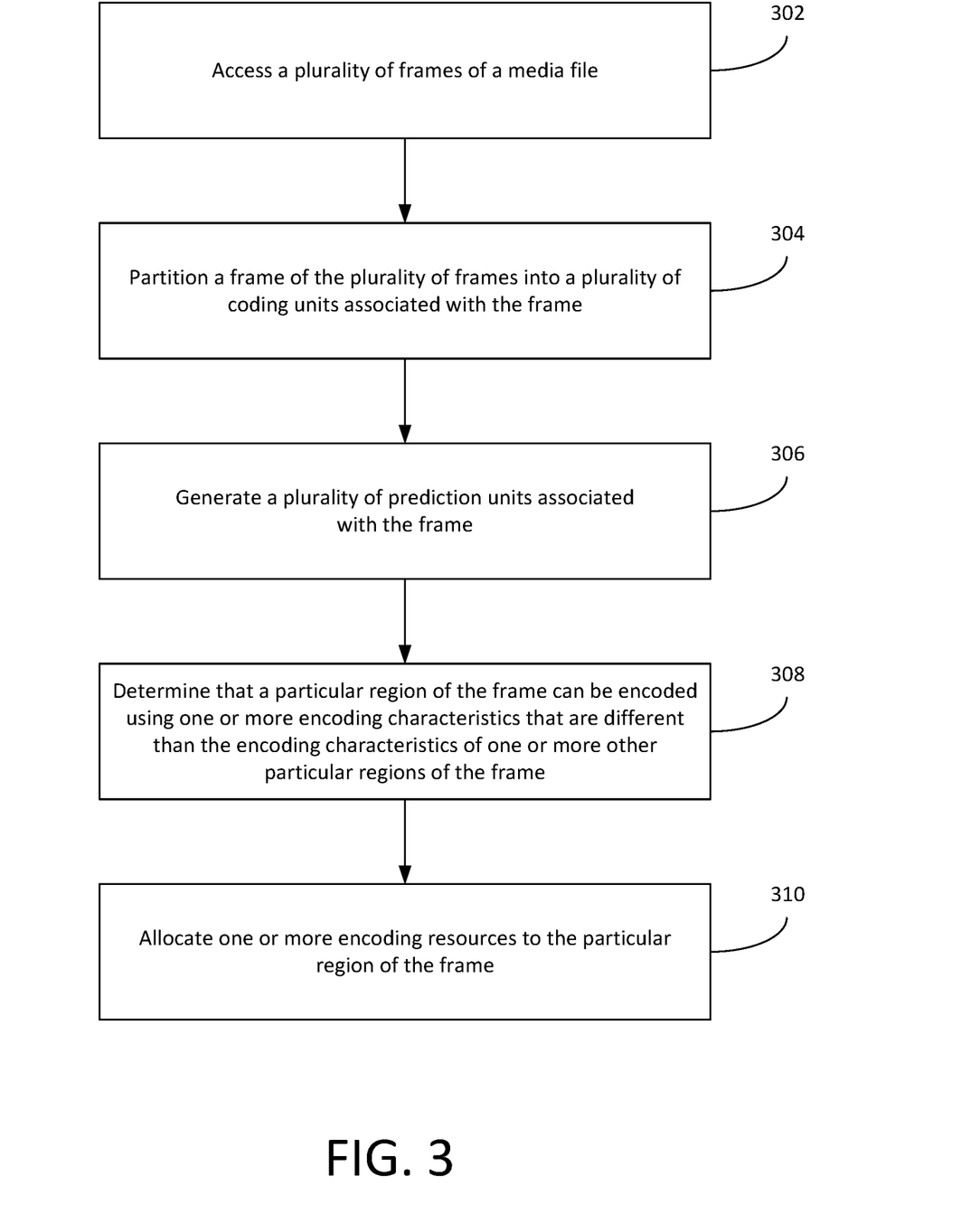
FIG. 3 is a flow chart of an example method.

FIG. 3 shows an example method in accordance with an aspect of the disclosure. At step 302, a media file comprising a plurality of frames may be accessed. The media file may comprise any type of media capable of being played by a device, such as a television show, a movie, a streaming media file, etc., or any portion thereof. The media file may comprise a plurality of frames. Each frame of the media file may correspond to a fragment of the media file, such as a two second fragment of the media file or a ten second fragment of the media file.

At step 304, one or more frames of the media file may be partitioned into a plurality of coding units. A video encoding process may comprise partitioning a frame into a plurality of coding tree units that each comprise a plurality of pixels. Coding tree units may comprise coding tree blocks that come in variable sizes (e.g., 16×16, 32×32 or 64×64) and, along with associated syntax elements (e.g., one luma CTB and two corresponding chroma CTBs), form the coding tree unit. The coding tree units may be further partitioned into coding units, which may also be referred to as coding blocks.

At step 306, a plurality of prediction units may be generated. The plurality of prediction units may be generated based on one or more previous frames of the media file. The encoder may generate a prediction of one or more current coding units based on previously encoded data. The prediction may comprise intra-prediction, which is based on previously encoded data of the current frame being encoded. The prediction may comprise inter-prediction, which is based on previously encoded data of a previously encoded reference frame. The inter-prediction stage may comprise determining a prediction unit (e.g., a prediction area) using motion compensation by determining a prediction unit that best matches a prediction region in the coding unit.

At step 308, it may be determined that a particular region of the frame can be encoded using one or more encoding characteristics that are different than the encoding characteristics of one or more other particular regions of the frame. The determination may be based on the plurality of coding units associated with the frame and the plurality of prediction units associated with the frame. The determination may be based on a training of the encoder using one or more neural networks. The neural networks may be trained such that the particular region of the frame can be automatically determined during an encoding process of the frame.

Determining that the particular region of the frame can be encoded using one or more encoding characteristics that are different than the encoding characteristics of the one or more other particular regions of the frame may comprise determining that one or more motion vectors associated with the particular region of the frame are not important to a viewer of the frame. In one example, the one or more encoding characteristics may comprise a number of bits to allocate to the particular region of the frame. Determining the one or more encoding characteristics for the particular region of the frame may comprise determining a number of bits to allocate for the encoding process of the particular region of the frame.

The one or more encoding characteristics of the particular region of the frame may be determined based on one or more textures displayed in the content of the particular region of the frame. An example region of a frame may contain one or more textures, including but not limited to grass, water, wood, sidewalk, textile material (including clothes, etc.), rubber, stone, sponge, plastic, paper, paint, tree leaves, etc. In such cases, the inter-prediction residual is not important and the difference between the inter-predicted frames is not noticeable at all by the viewer (e.g., below a Just Noticeable Difference (JND) of the Human Visual System (HVS)).

At step 310, one or more encoding resources may be allocated to the particular region of the frame. The particular region of the frame may comprise an inter-picture prediction residual signal. Allocating the one or more encoding resources to the particular region of the frame may comprise setting the inter-picture prediction residual signal associated with the particular region of the frame to zero. Allocating the one or more encoding resources to the particular region of the frame may comprise allocating fewer bits to the particular region of the frame than to the one or more other particular regions of the frame. For example, the encoder may determine that it is not necessary to encode changes in the particular region of the frame that comprises a particular texture (e.g., grass on a soccer pitch). Thus, the encoder may determine to set the inter-picture prediction residual signal associated with the particular region of that frame to zero, thereby allocating less encoding resources or bits to that particular region of the frame. In doing so, the encoder may allocate a higher number of resources or bits to other particular regions of the frame that are determined to be more important (e.g., one or more players on the soccer pitch).

While the example above described a scenario where a particular region of a frame is determined to be less important than other regions of the frame, and therefore less encoding resources or bits are allocated to the particular region of the frame in the encoding process, it is understood that determining that a particular region of the frame can be encoded using one or more encoding characteristics that are different than the encoding characteristics of one or more other particular regions of the frame may comprise determining that more encoding resources or bits should be allocated to the particular region of the frame. Using the example above, the encoder may determine that more encoding resources should be allocated to the soccer ball and one or more players on the soccer pitch, and therefore less encoding resources would be available to other areas such as the pitch itself.

Figure 4:
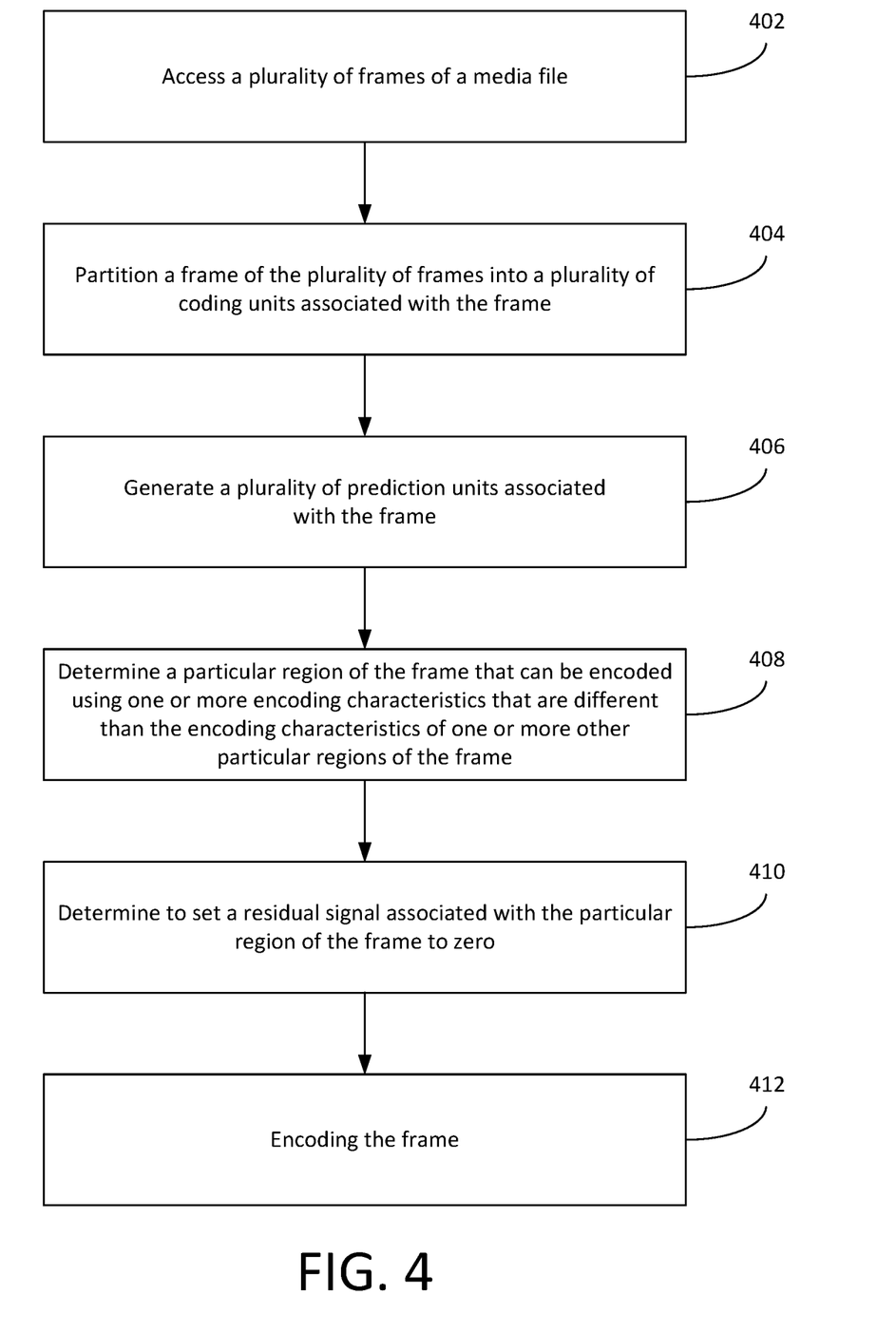
FIG. 4 is a flow chart of an example method.

FIG. 4 shows another example method. At step 402, a media file comprising a plurality of frames may be accessed. The media file may comprise any type of media capable of being played by a device, such as a television show, a movie, a streaming media file, etc., or any portion thereof. The media file may comprise a plurality of frames. Each frame of the media file may correspond to a fragment of the media file, such as a two second fragment of the media file or a ten second fragment of the media file.

At step 404, one or more frames of the media file may be partitioned into a plurality of coding units. A video encoding process may comprise partitioning a frame into a plurality of coding tree units that each comprise a plurality of pixels. Coding tree units may comprise coding tree blocks that come in variable sizes (e.g., 16×16, 32×32 or 64×64) and, along with associated syntax elements (e.g., one luma CTB and two corresponding chroma CTBs), form the coding tree unit. The coding tree units may be further partitioned into coding units, which may also be referred to as coding blocks.

At step 406, a plurality of prediction units may be generated. The plurality of prediction units may be generated based on one or more previous frames of the media file. The encoder may generate a prediction of one or more current coding units based on previously encoded data. The prediction may comprise intra-prediction, which is based on previously encoded data of the current frame being encoded. The prediction may comprise inter-prediction, which is based on previously encoded data of a previously encoded reference frame. The inter-prediction stage may comprise determining a prediction unit (e.g., a prediction area) using motion compensation by determining a prediction unit that best matches a prediction region in the coding unit.

At step 408, a particular region of the frame can be encoded using one or more encoding characteristics that are different than the encoding characteristics of one or more other particular regions of the frame may be determined. The determination may be based on the plurality of coding units associated with the frame and the plurality of prediction units associated with the frame. The determination may be based on a training of the encoder using one or more neural networks. The neural networks may be trained such that the particular region of the frame can be automatically determined during an encoding process of the frame.

Determining the particular region of the frame that can be encoded using one or more encoding characteristics that are different than the encoding characteristics of the one or more other particular regions of the frame may comprise determining that one or more motion vectors associated with the particular region of the frame are not important to a viewer of the frame. Determining the one or more encoding characteristics for the particular region of the frame may comprise determining a number of bits to allocate for the encoding process of the particular region of the frame.

The one or more encoding characteristics of the particular region of the frame may be determined based on one or more textures displayed in the content of the particular region of the frame. An example region may contain one or more textures, including but not limited to grass, water, wood, sidewalk, textile material (including clothes, etc.), rubber, stone, sponge, plastic, paper, paint, tree leaves, etc. In such cases, the inter-prediction residual is not important and the difference between the inter-predicted frames is not noticeable at all by the viewer (e.g., below a Just Noticeable Difference (JND) of the Human Visual System (HVS)).

At step 410, the encoder may determine to set a residual signal associated with the particular region of the frame to zero. The particular region of the frame may comprise an inter-picture prediction residual signal. Allocating the one or more encoding resources to the particular region of the frame may comprise setting the inter-picture prediction residual signal associated with the particular region of the frame to zero. Allocating the one or more encoding resources to the particular region of the frame may comprise allocating fewer bits to the particular region of the frame than to the one or more other particular regions of the frame. For example, the encoder may determine that it is not necessary to encode changes in the particular region of the frame that comprises a particular texture (e.g., grass on a soccer pitch).

At step 412, the encoder may encode the frame. The encoder may encode the frame based on setting the residual signal associated with the particular region of the frame to zero. In determining to set the inter-picture prediction residual signal associated with the particular region of that frame to zero, the encoder may thereby allocate less encoding resources or bits to that particular region of the frame. In doing so, the encoder may allocate a higher number of resources or bits to other particular regions of the frame that are determined to be more important (e.g., one or more players on the soccer pitch).

Figure 5:
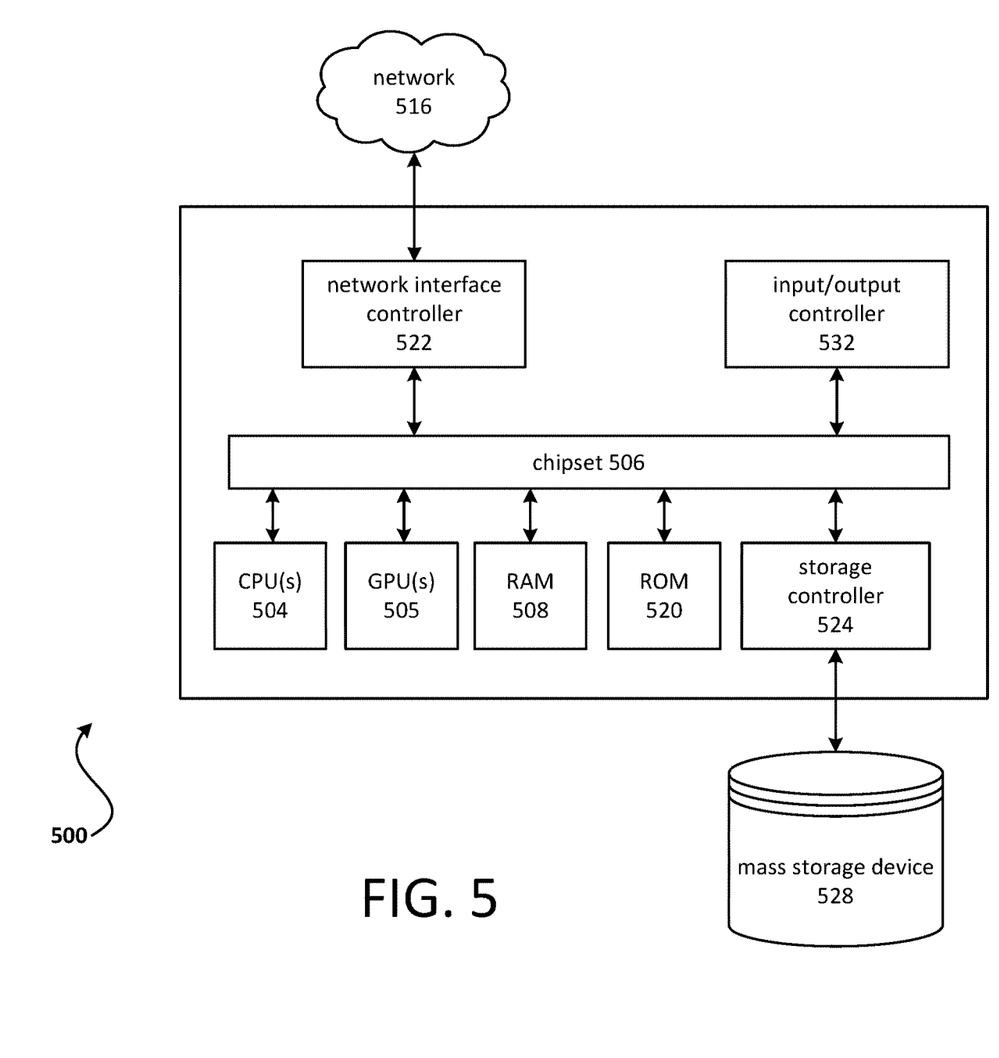
FIG. 5 is a block diagram of an example computing device.

FIG. 5 depicts a computing device that may be used in various aspects, such as the servers, modules, and/or devices depicted in FIG. 1. With regard to the example architecture of FIG. 1, the server 102, the media file processor 104, the encoder 106, the database 108, the device 110, the processor 112, the display 114, and/or the speaker 116 may each be implemented in an instance of a computing device 500 of FIG. 5. The computer architecture shown in FIG. 5 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 3 and 4.

The computing device 500 may include a baseboard, or "motherboard," which is a printed circuit board to which a multitude of components or devices may be connected by way of a system bus or other electrical communication paths. One or more central processing units (CPUs) 504 may operate in conjunction with a chipset 506. The CPU(s) 504 may be standard programmable processors that perform arithmetic and logical operations necessary for the operation of the computing device 500.

The CPU(s) 504 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 504 may be augmented with or replaced by other processing units, such as GPU(s) 505. The GPU(s) 505 may comprise processing units specialized for but not necessarily limited to highly parallel computations, such as graphics and other visualization-related processing.

A user interface may be provided between the CPU(s) 504 and the remainder of the components and devices on the baseboard. The interface may be used to access a random access memory (RAM) 508 used as the main memory in the computing device 500. The interface may be used to access a computer-readable storage medium, such as a read-only memory (ROM) 520 or non-volatile RAM (NVRAM) (not shown), for storing basic routines that may help to start up the computing device 500 and to transfer information between the various components and devices. ROM 520 or NVRAM may also store other software components necessary for the operation of the computing device 500 in accordance with the aspects described herein. The user interface may be provided by a one or more electrical components such as the chipset 506.

The computing device 500 may operate in a networked environment using logical connections to remote computing nodes and computer systems through local area network (LAN) 516. The chipset 506 may include functionality for providing network connectivity through a network interface controller (NIC) 522, such as a gigabit Ethernet adapter. A NIC 522 may be capable of connecting the computing device 500 to other computing nodes over a network 516. It should be appreciated that multiple NICs 522 may be present in the computing device 500, connecting the computing device to other types of networks and remote computer systems.

The computing device 500 may be connected to a storage device 528 that provides non-volatile storage for the computer. The storage device 528 may store system programs, application programs, other program modules, and data, which have been described in greater detail herein. The storage device 528 may be connected to the computing device 500 through a storage controller 524 connected to the chipset 506. The storage device 528 may consist of one or more physical storage units. A storage controller 524 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 500 may store data on a storage device 528 by transforming the physical state of the physical storage units to reflect the information being stored. The specific transformation of a physical state may depend on various factors and on different implementations of this description. Examples of such factors may include, but are not limited to, the technology used to implement the physical storage units and whether the storage device 528 is characterized as primary or secondary storage and the like.

For example, the computing device 500 may store information to the storage device 528 by issuing instructions through a storage controller 524 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 500 may read information from the storage device 528 by detecting the physical states or characteristics of one or more particular locations within the physical storage units.

In addition to the storage device 528 described herein, the computing device 500 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 500.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A storage device, such as the storage device 528 depicted in FIG. 5, may store an operating system utilized to control the operation of the computing device 500. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The storage device 528 may store other system or application programs and data utilized by the computing device 500.

The storage device 528 or other computer-readable storage media may also be encoded with computer-executable instructions, which, when loaded into the computing device 500, transforms the computing device from a general-purpose computing system into a special-purpose computer capable of implementing the aspects described herein. These computer-executable instructions transform the computing device 500 by specifying how the CPU(s) 504 transition between states, as described herein. The computing device 500 may have access to computer-readable storage media storing computer-executable instructions, which, when executed by the computing device 500, may perform the methods described in relation to FIGS. 3 and 4.

A computing device, such as the computing device 500 depicted in FIG. 5, may also include an input/output controller 532 for receiving and processing input from a number of input devices, such as a keyboard, a mouse, a touchpad, a touch screen, an electronic stylus, or other type of input device. Similarly, an input/output controller 532 may provide output to a display, such as a computer monitor, a flat-panel display, a digital projector, a printer, a plotter, or other type of output device. It will be appreciated that the computing device 500 may not include all of the components shown in FIG. 5, may include other components that are not explicitly shown in FIG. 5, or may utilize an architecture completely different than that shown in FIG. 5.

As described herein, a computing device may be a physical computing device, such as the computing device 500 of FIG. 5. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A method comprising:
accessing, at an encoder, a plurality of frames of a media file;
partitioning, at the encoder, a frame of the plurality of frames of the media file into a plurality of coding units associated with the frame;
generating, at the encoder and based on encoding data associated with one or more frames of the media file prior to the frame, a plurality of prediction units associated with the plurality of coding units associated with the frame;
determining, at the encoder, based on the plurality of prediction units associated with the plurality of coding units associated with the frame, and using one or more neural networks analyzing one or more spatial characteristics of content of the frame, that a particular region of the frame can be encoded using one or more first encoding characteristics that are different than second encoding characteristics of one or more other particular regions of the frame; and
allocating, at the encoder and based on the one or more first encoding characteristics and the one or more second encoding characteristics, lower encoding resources for one or more motion vectors associated with the particular region of the frame than to encoding resources for one or more motion vectors associated with the one or more other particular regions of the frame.

2. The method of claim 1, wherein allocating the lower encoding resources for one or more motion vectors associated with the particular region of the frame than to encoding resources for one or more motion vectors associated with the one or more other particular regions of the frame comprises allocating fewer bits for one or more motion vectors associated with the particular region of the frame than to encoding resources for one or more motion vectors associated with the one or more other particular regions of the frame.

3. The method of claim 1, wherein the particular region of the frame is determined automatically using the one or more neural networks analyzing one or more spatial characteristics of the frame.

4. The method of claim 1, wherein determining that the particular region of the frame can be encoded using one or more first encoding characteristics that are different than the second encoding characteristics of the one or more other particular regions of the frame comprises determining that the one or more spatial characteristics of the content in the particular region of the frame comprises one or more textures that are different from one or more textures in the one or more other particular regions of the frame.

5. The method of claim 1, wherein the one or more motion vectors associated with the particular region of the frame comprise an inter-picture prediction residual signal.

6. The method of claim 5, wherein allocating the lower encoding resources for the one or more motion vectors associated with the particular region of the frame comprises setting the inter-picture prediction residual signal associated with the particular region of the frame to zero.

7. A method comprising:
accessing, at an encoder, a plurality of frames of a media file;
partitioning, at the encoder, a frame of the plurality of frames of the media file into a plurality of coding units associated with the frame;
generating, at the encoder and based on encoding data associated with one or more frames of the media file prior to the frame, a plurality of prediction units associated with the plurality of coding units associated with the frame;
automatically determining, at the encoder and based on the plurality of prediction units associated with the plurality of coding units associated with the frame, and using one or more neural networks analyzing one or more spatial characteristics of content of the frame, a particular region of the frame that can be encoded using one or more first encoding characteristics that are different than second encoding characteristics of one or more other particular regions of the frame;
determining, at the encoder and based on the one or more first encoding characteristics of the particular region of the frame, to set a residual signal associated with the particular region of the frame to zero; and
encoding, at the encoder and based on setting the residual signal associated with the particular region of the frame to zero, the frame.

8. The method of claim 7, wherein determining the particular region of the frame that can be encoded using one or more first encoding characteristics that are different than the second encoding characteristics of the one or more other particular regions of the frame comprises determining that the one or more spatial characteristics of the content in the particular region of the frame comprises one or more textures that are different from one or more textures in the one or more other particular regions of the frame.

9. The method of claim 7, wherein the residual signal associated with the particular region of the frame comprises an inter-picture prediction residual signal associated with the particular region of the frame.

10. The method of claim 1, wherein motion in the particular region between the frame and a previous frame is below a Just Noticeable Difference of the Human Visual System.

11. The method of claim 7, wherein motion in the particular region between the frame and a previous frame is below a Just Noticeable Difference of the Human Visual System.

12. The method of claim 1, further comprising training the one or more neural networks to identify various spatial characteristics of content.

13. The method of claim 7, further comprising training the one or more neural networks to identify various spatial characteristics of content.

14. The method of claim 1, wherein each of the plurality of coding units comprises one or more of the plurality of prediction units.

15. The method of claim 7, wherein each of the plurality of coding units comprises one or more of the plurality of prediction units.

16. The method of claim 1, further comprising encoding, at the encoder and based on allocating the lower encoding resources for the one or more motion vectors associated with the particular region of the frame, the frame.

17. A method comprising:
accessing a plurality of frames;
partitioning a frame of the plurality of frames into a plurality of blocks;
determining, using one or more neural networks analyzing one or more spatial characteristics of content of the frame, that content of a particular block of the frame has a particular spatial characteristic; and
determining, based on the determination that the content of the particular block of the frame has the particular spatial characteristic, to set a residual signal associated with the particular block of the frame to zero; and
encoding, based on the setting of the residual signal associated with the particular block of the frame to zero, the frame.

18. The method of claim 17, wherein the plurality of blocks are a plurality of prediction units, and the particular block is a particular prediction unit.

19. The method of claim 17, wherein the residual signal associated with the particular block of the frame is an inter-picture prediction residual signal associated with the particular block of the frame.

20. The method of claim 17, further comprising training the one or more neural networks to identify various spatial characteristics of content.

* * * * *